April 16, 1968     T. H. SAWYER     3,378,651

TRAVELING ELECTRIC POWER COLLECTOR

Filed July 27, 1965     2 Sheets-Sheet 1

INVENTOR.
THOMAS H. SAWYER
BY
ATTORNEY

United States Patent Office 3,378,651
Patented Apr. 16, 1968

3,378,651
TRAVELING ELECTRIC POWER COLLECTOR
Thomas H. Sawyer, Mansfield, Ohio, assignor to The Ohio Brass Company, Mansfield, Ohio, a corporation of New Jersey
Filed July 27, 1965, Ser. No. 475,205
12 Claims. (Cl. 191—58)

ABSTRACT OF THE DISCLOSURE

This patent discloses electric power collectors for rail cars in which the collector head is carried by a boom of structural insulating material and in which the contact means is carried by a body of structural insulating material.

---

This application relates to the traveling collector apparatus for electrically driven rail cars.

A general objectve of the invention is to transmit electric power from an energized rail conductor to a rail car.

Another objective of the invention is to provide an improved collector apparatus adapted for use at high speeds and at high energizing voltages.

Electrical collector apparatus for rail cars must satisfy a number of conflicting requirements. The collector apparatus is mounted on the rail car and has a collector head which engages the power rail in contact therewith to provide a continuous electrical connection between the power rail and associated energizing system and the electric drive and control system of the rail car. The collector apparatus functions to maintain the collector head in engagement with the power rail, electrically insulate the collector head from the body of the car, and provide the necessary terminal connections from the collector head to the electrical apparatus of the car. At high speeds and at high energizing voltages and powers severe design requirements are imposed insofar as the mechanical and dynamic characteristics of the collector head and support apparatus are concerned, while providing the insulation required for high line voltages.

The collector apparatus described herein satisfies the above described requirements in that the collector head follows the current rail at high speeds and substantial changes in car-rail spacing while providing an adequate insulation for high energizing voltages. The collector apparatus is useful for single or multiphase power systems.

The invention will be further understood from the following detailed specification and claims, taken in connection with the appended drawings in which:

Figure 2:
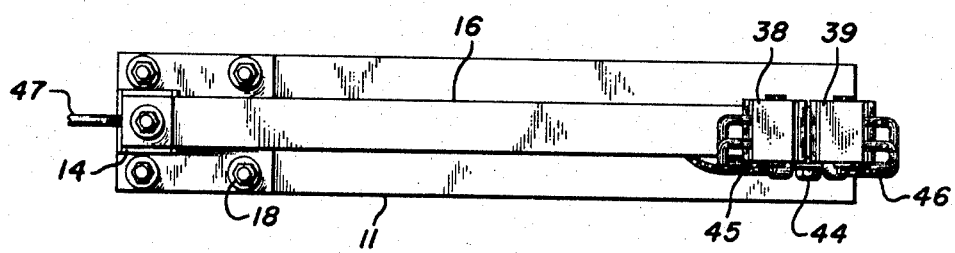
FIG. 2 is a top plan view of the collector apparatus of FIG. 1.
Figure 1:
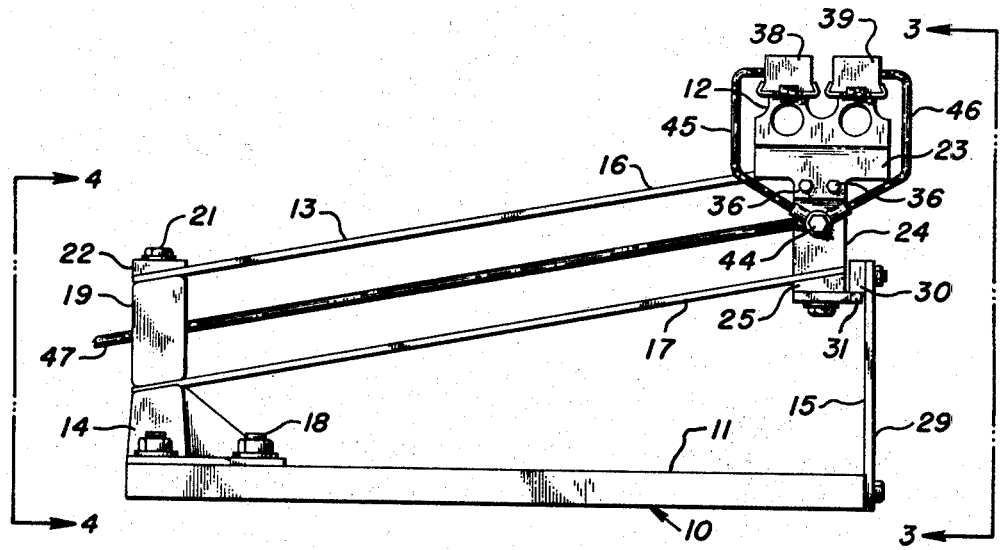
FIG. 1 is a side elevation view of a collector apparatus constructed in accordance with the invention.
Figure 3:
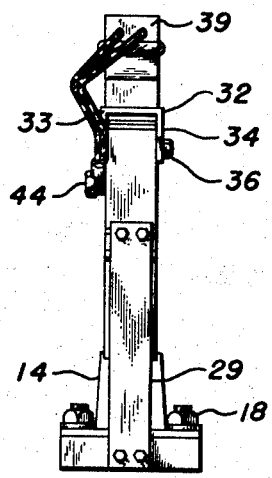
FIG. 3 is an end view of the collector apparatus of FIG. 1, taken in the direction 3—3 in FIG. 1.
Figure 4:
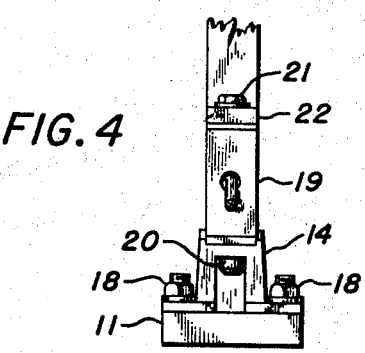
FIG. 4 is an end view of the collector apparatus of FIG. 1, taken in the direction 4—4 in FIG. 1.
Figure 5:
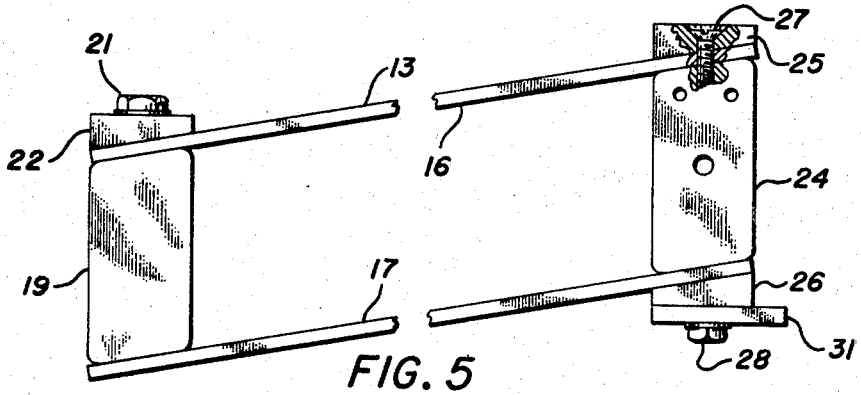
FIG. 5 is an enlarged view of the end parts of the boom of the collector apparatus.
Figure 7:
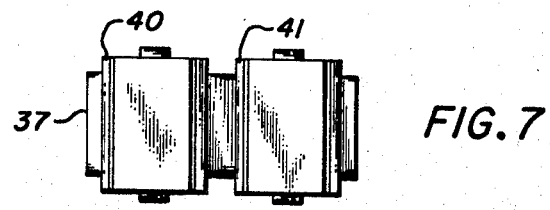
FIG. 7 is a top plan view of the head, taken in the direction 7—7 in FIG. 6.
Figure 6:
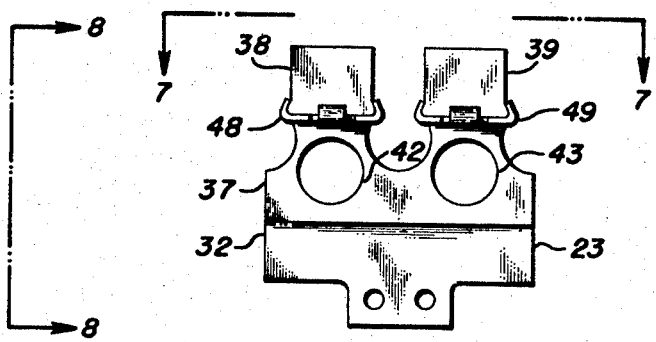
FIG. 6 is a side elevation view of the head of the collector apparatus.
Figure 8:
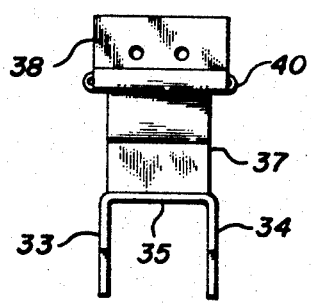
FIG. 8 is an end elevation view of the head of the collector apparatus, taken in the direction 8—8 in FIG. 6.

Referring now to FIG. 1, the collector apparatus 10 comprises a base 11, a collector head 12, a boom 13, a stand 14, and a retent 15. The base 11 is adapted to be secured to the side or top of a rail car and mounts the collector apparatus in fixed relation to the rail car. The collector head engages a power rail and moves along the rail as the car moves along the associated track, for energizing the car from the power rail.

The boom 13 supports the head 12 in insulated relation to the base 11 and to the car, and comprises two elongate members 16 and 17 of structural insulating material carried, at one end of the members, by the stand 14. The stand 14 comprises a generally bell-shaped cast housing part and is secured to the base 11 by a plurality of screw fasteners 18. The stand 14 supports the two boom members 16 and 17 in spaced relation to the base 11, and the boom members are held in spaced relation to each other by a spacer 19. The spacer 19 is secured to the stand 14 by a screw fastener 20, and a screw fastener 21 extends through an auxiliary spacer 22 to secure the boom member 16 to the spacer 19. The boom members 16 and 17 are held in predetermined angular disposition with respect to the base 11 in the vertical direction by the adjoining inclined surfaces of the stand 14 and of the spacers 19 and 22. The boom members are held in longitudinally aligned relation with the base 11 by a groove in the stand 14, receiving the extremity of the member 17. The transverse and longitudinal disposition of the boom is maintained and vibration resistant character of the parts is insured by epoxy resin bonds between the boom members 16 and 17 and the associated spacers and parts.

The head 12 is carried at the outer end of the boom members 16 and 17, and the members are secured to the frame 23 of the head 12 by means of spacers 24, 25, and 26 and screw fasteners 27 and 28. The head 12 is oriented with respect to the base 11 by inclined surfaces on the spacers 24, 25, and 26, parallel to the associated surfaces on the spacers 19 and 22 and the stand 14.

The members 16 and 17 are constructed of glass fiber reinforced polyester resin and have a substantially rectangular cross section of uniform thickness along the length of the member to provide a substantially uniform elastic characteristic at the head 12 throughout the range of movement of the collector apparatus. The members 16 and 17, with the spacers 19 and 24 and the associated clamping parts, constitute a parallel linkage such that the head 12 moves toward and away from the base 11 with the running surface of the head 12 maintained in fixed relation to the base 11 and associated rail car and track. The boom members 16 and 17 are resilient throughout the entire length of the members so that inertial effects are minimized.

The members 16 and 17 may be cut from continuously formed glass fiber reinforced material or may be molded or wound to particular deformation characteristics by change in thickness along the length of the member or change in amount of tension of the fiber. In one embodiment, a commercial grade of glass fiber laminate having cross ply filament orientation was molded with epoxy resin to provide boom members with high flexural modulus and high flexural strength.

The retent 15 comprises an elongate member 29 secured to the base 11 and having a retent block 30 at the outer extremity thereof for engagement by the part 31 on the boom 13. The retent 15 limits the outward movement of the head 12 away from the base 11.

The head 12 comprises the frame 23 comprising a metal body 32 of generally U-shaped cross section and having laterally spaced parallel side parts 33 and 34 for securing the head to the boom 13 and a center part 35. The side parts 33 and 34 extend over and along the exterior of the spacers 25 and 24 and are secured to the spacer 24 by screw fasteners 36. A flexible spacer and support member 37 is attached to the top surface of the center part 35, and the member 37 carries two contact assemblies comprising contact blocks 38 and 39 and associated metal carrier members 40 and 41. The contact blocks 38 and 39 are each constructed as a body of rigid structural carbon and are adapted to slide along the surface of the power rail in current conductive contact therewith, as is known in the art.

The member 37 supports the contact blocks 38 and 39 for substantially independent movement of each block with respect to the power rail to reduce the inertia and improve the follow characteristics of the collector. The arrangement minimizes damage to the surfaces of the contact blocks and improves the continuity of the transfer characteristic.

The support member 37 is constructed as a generally rectangular body of flexible resilient material, such as butyl silicone, polypropylene, or polybutadiene rubber. The body of the support member is shaped along the exterior surfaces and by openings 42 and 43 transversely through the member to provide the best follow characteristics.

Resilient materials, such as the rubbers referred to above, should have a damping coefficient sufficient to dissipate vibrational energy of the contact block without impairing the follow characteristics of the boom and head assembly. It is desirable that the damping of the head assembly not be substantially in excess of critical damping for best follow characteristics of the collector. The arrangement does not ordinarily require separate damping of the boom arms.

The contact blocks 38 and 39 are connected to a terminal 44 by means of terminal leads 45 and 46 extending laterally outwardly from the blocks in spaced relation to the support member 37. The terminal leads 45 and 46 are made of flexible material arranged so that the mobility of the contact blocks and the associated carriers is not impeded. The terminal 44 is connected to the associated electrical apparatus of the rail car by means of a cable 47 which extends along and between the boom members 16 and 17.

The contact blocks 38 and 39 are held by spring tabs 48 and 49 on the carrier members to facilitate installation and replacement of the blocks.

In an exemplary embodiment of the device, the collector was operated at speeds to 80 miles per hour at a voltage of 4,160 volts, 3 phase, phase to phase, and at a current of 100 amperes. The collector apparatus operated quietly and without damage to the carbon contact blocks.

It is to be understood that the foregoing description is not intended to restrict the scope of the invention and that various rearrangements of the parts and modifications of the design may be resorted to. The following claims are directed to combinations of elements which embody the invention or inventions of this application.

I claim:

1. An electric power collector adapted for running engagement with an electrified distribution rail, comprising a base, a stand at one extremity of the base, a collector head comprising means for traveling engagement with the distribution rail, and means carrying the head in insulated movable relation to the base comprising a parallel linkage constituted by elongate members of structural insulating material secured to the stand and head and held in spaced relation thereto, the said members being elastically deformable for holding the collector head in substantially parallel working engagement with the distribution rail while providing displacement of the collector head relative to the base.

2. An electric power collector in accordance with claim 1, in which the parallel linkage comprises two elongate members of resilient structural insulating material and two spacers for holding the elongate members in transversely spaced relation, means securing the elongate members and spacer to the base at the car end of the linkage, and means securing the head to the elongate members and spacer at the rail end of the linkage.

3. An electric power collector in accordance with claim 2, in which the elongate members are constructed of fiberglass reinforced epoxy resin with substantial elastic deformation throughout the length thereof with movement of the head for minimizing inertia effects thereof.

4. An electric power collector in accordance with claim 1, in which the collector head comprises contact means for engagement with the distribution rail, and a body of resilient electrically insulating material supporting the contact means; from the elongate linkage.

5. An electric power collector in accordance with claim 4, in which two contact blocks are supported in the longitudinal direction of the collector head by spaced separate parts of the body of resilient material for substantially independent movement thereof.

6. An electric power collector in accordance with claim 4, in which the body of resilient material is damped for elastic support of the contact means without substantial vibration thereof relative to the frame.

7. An electric power collector in accordance with claim 4, in which the contact means is held by a metal terminal member with the resilient insulating material bonded thereto and conductive terminal leads connected to the contact means.

8. An electric power collector comprising base means, a collector head comprising contact means for engagement with a fixed conductor, and a terminal for the said contact means, boom means comprising an elongate member of structural insulating material connected at one end thereof to the base means and at the remaining end thereof to the collector head, and a body of resilient electrically insulating material supporting the contact means from the boom means, all for support of the collector head in high voltage insulated relation from the base and mechanically stable following relation to the fixed conductor.

9. An electric power collector in accordance with claim 8, in which the elongate member is elastically deformable along a substantial portion of the length thereof, and the resilient material of the head is substantially critically damped for dissipating vibrational energy of the head.

10. An electric power collector in accordance with claim 8, in which two contact blocks are supported in the longitudinal direction of the collector head by spaced separate parts of the body of resilient material for substantially independent movement thereof.

11. A head for an electric power collector including contact means comprising two contact members and means for holding the contact members comprising two separate conductive carrier and terminal members for the contact members, and means comprising a body of flexible resilient electrical insulating material attached to said carrier and terminal members carrying the contact members for substantially separate movement thereof, and frame means attached to said body of resilient material adapted for attachment to a boom means for carrying the head, and the said body of resilient material being shaped to determine the dynamic characteristics thereof.

12. A collector head in accordance with claim 11, and in combination therewith, a contact member of structural carbon held by each one of the said carrier and terminal members and cooperating with the body of insulating material.

References Cited
UNITED STATES PATENTS

| | | | |
|---|---|---|---|
| 394,037 | 12/1888 | Van Depoele | 191—64 |
| 435,166 | 8/1890 | Atwood | 191—70 X |
| 450,683 | 4/1891 | Short | 191—57 |
| 496,631 | 5/1893 | Adams | 191—69 X |
| 566,237 | 8/1896 | Short | 191—64 |
| 588,488 | 8/1897 | Sell | 191—65 |
| 845,323 | 2/1907 | Wensinger | 191—65 |
| 931,292 | 8/1909 | Goldman | 191—64 X |
| 1,371,557 | 3/1921 | Gunn | 191—64 |
| 3,123,191 | 3/1964 | Sprigings | 191—58 |
| 3,124,226 | 3/1964 | Sprigings | 191—59.1 |

ARTHUR L. LA POINT, *Primary Examiner.*

S. T. KRAWCZEWICZ, *Assistant Examiner.*